(12) United States Patent
Lin

(10) Patent No.: US 7,388,743 B2
(45) Date of Patent: Jun. 17, 2008

(54) ELECTRONIC DEVICE AND KEYBOARD THEREOF

(75) Inventor: Jui-Yi Lin, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 23 days.

(21) Appl. No.: 11/581,370

(22) Filed: Oct. 17, 2006

(65) Prior Publication Data

US 2007/0146976 A1    Jun. 28, 2007

(30) Foreign Application Priority Data

Dec. 23, 2005    (TW) .............................. 94146031 A

(51) Int. Cl.
*G06F 1/16*    (2006.01)
(52) U.S. Cl. ........................ 361/680; 455/566; 345/169; 206/320
(58) Field of Classification Search .............. 455/575.4, 455/566, 544; 345/165, 169, 175; 206/320; 361/679–687, 724–727; 400/489
See application file for complete search history.

(56) References Cited

U.S. PATENT DOCUMENTS 5,613,786 A * 3/1997 Howell et al. ............... 400/489

2005/0035950 A1 * 2/2005 Daniels ....................... 345/169
2005/0083645 A1 * 4/2005 Moore et al. ................ 361/683

FOREIGN PATENT DOCUMENTS

CN    1166645 A    12/1997

* cited by examiner

Primary Examiner—Hung Van Duong
(74) Attorney, Agent, or Firm—Birch, Stewart, Kolasch & Birch, LLP

(57) ABSTRACT

A keyboard is disposed in a base having a first connecting member and includes a first keyboard body, a second keyboard body, a second connecting member and a connecting assembly. The second keyboard body is adjacent to the first keyboard body. The second connecting member disposed on the first keyboard body or the second keyboard body is to be connected to the first connecting member. The connecting assembly connecting the first keyboard body and the second keyboard body can adjust a distance between the first keyboard body and the second keyboard body. When the first keyboard body is distant from the second keyboard body, the second connecting member is connected to the first connecting member. An electronic device with the keyboard is also disclosed.

22 Claims, 7 Drawing Sheets

ELECTRONIC DEVICE AND KEYBOARD THEREOF

BACKGROUND OF THE INVENTION

1. Field of Invention

The invention relates to an electronic device and a keyboard thereof and, in particular, to an electronic device and a fixing structure of a keyboard thereof.

2. Related Art

Referring to FIG. 1, a notebook computer 1 mainly includes a base 11 and a keyboard body 12. The base 11 has a chamber 111 for accommodating the keyboard body 12, and a plurality of screw holes 112 are formed on the chamber 111. In addition, the keyboard body 12 has a plurality of tabs 121, each of which includes a through hole 122. The keyboard body 12 can be screwed by several screws 13, which pass through the through holes 122 of the keyboard body 12 and the screw holes 112 of the base 11. Thus, the keyboard body 12 can be mounted within the chamber 111 of the base 11.

Thus, a screwdriver has to be used in either the assembling or disassembling process. The processes of assembling and disassembling the keyboard body 12 using the screwdriver are complicated and waste a lot of time. In addition, the thread of the screw 13 or the screw hole 112 may be damaged due to the improperly applied force during the assembling or disassembling process.

SUMMARY OF THE INVENTION

In view of the foregoing, an objective of the invention is to provide an electronic device and a keyboard thereof, which may be assembled without using additional fastening elements.

To achieve the above objective, the invention provides a keyboard, which is disposed in a base having a first connecting member. The keyboard includes a first keyboard body, a second keyboard body, a second connecting member and a connecting assembly. The second keyboard body is movably relative to the first keyboard body so that a total width of the keyboard is changeable. The connecting assembly connects the first keyboard body to the second keyboard body. The second connecting member is disposed in the first keyboard body and is capable of connecting to the first connecting member. When the first keyboard body and the second keyboard body are mounted on the base, the connecting assembly enables the total width of the first keyboard body and the second keyboard body to be lengthened so that the second connecting member is connected to the first connecting member.

To achieve the above objective, the invention also provides an electronic device including a base and a keyboard. The keyboard includes a first keyboard body, a second keyboard body, a second connecting member and a connecting assembly. The base has a first connecting member. The second keyboard body is movably relative to the first keyboard body so that a total width of the keyboard is changeable. The second connecting member is connected to the first keyboard body or the second keyboard body. The second connecting member is disposed in the first keyboard body and is capable of connecting to the first connecting member. The connecting assembly connects the first keyboard body to the second keyboard body. When the first keyboard body and the second keyboard body are mounted on the base, the connecting assembly enables the total width of the first keyboard body and the second keyboard body to be lengthened so that the second connecting member is connected to the first connecting member.

As mentioned above, because the first keyboard body and the second keyboard body may slide relative to each other in the invention, the connecting assembly can adjust the relative distance between the first keyboard body and the second keyboard body so as to change the total length of the keyboard. With the additional arrangements of the first connecting member and the second connecting member, the keyboard can be assembled without using any other tool, and the first keyboard body and the second keyboard body can be easily assembled on or disassembled from the base when the bodies are moved near to or away from each other. Compared to the prior art, the electronic device and keyboard of the invention can be easily assembled, and have short working time and reduced cost.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
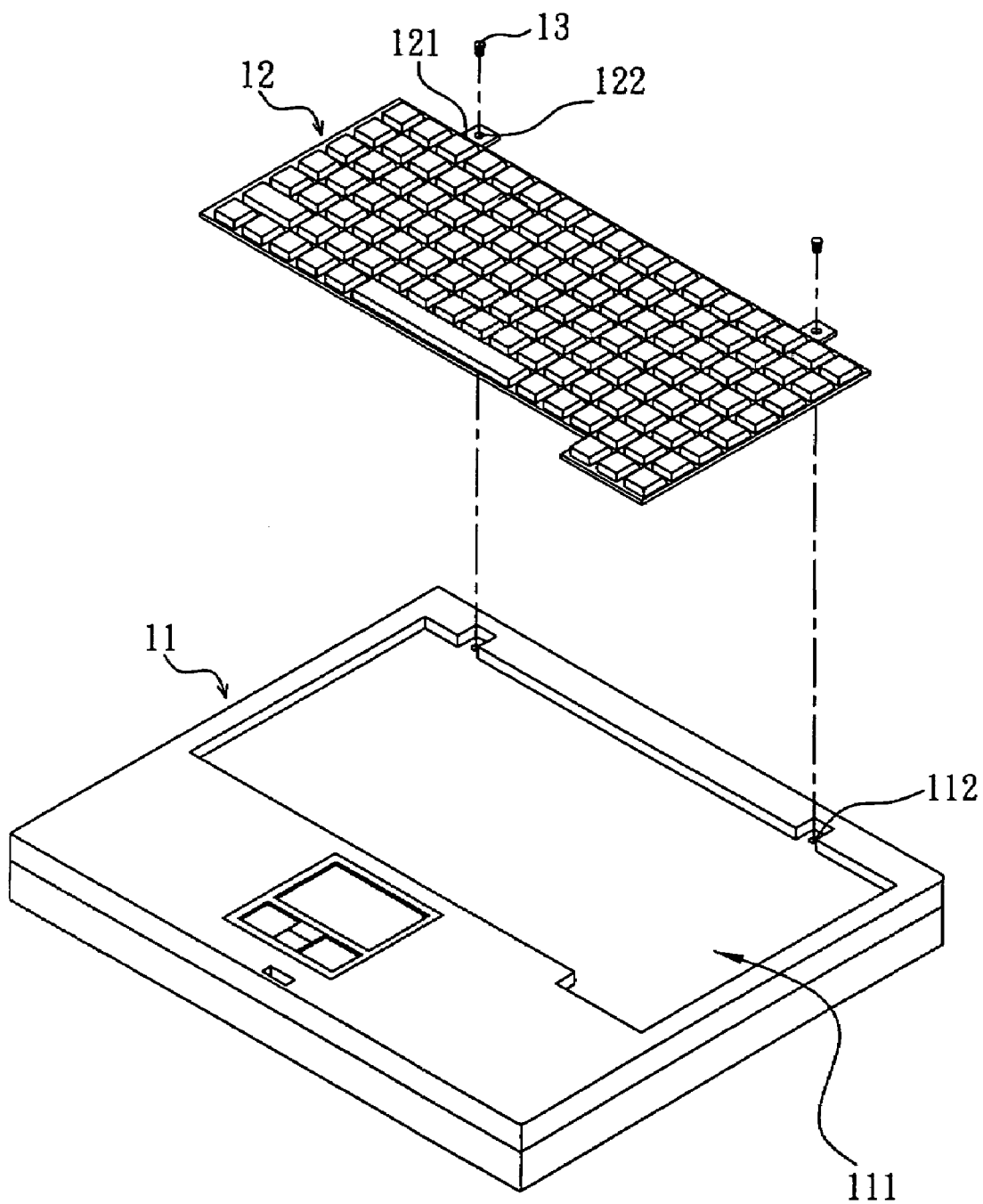
FIG. 1 is a schematic illustration showing a conventional notebook computer.
Figure 2:
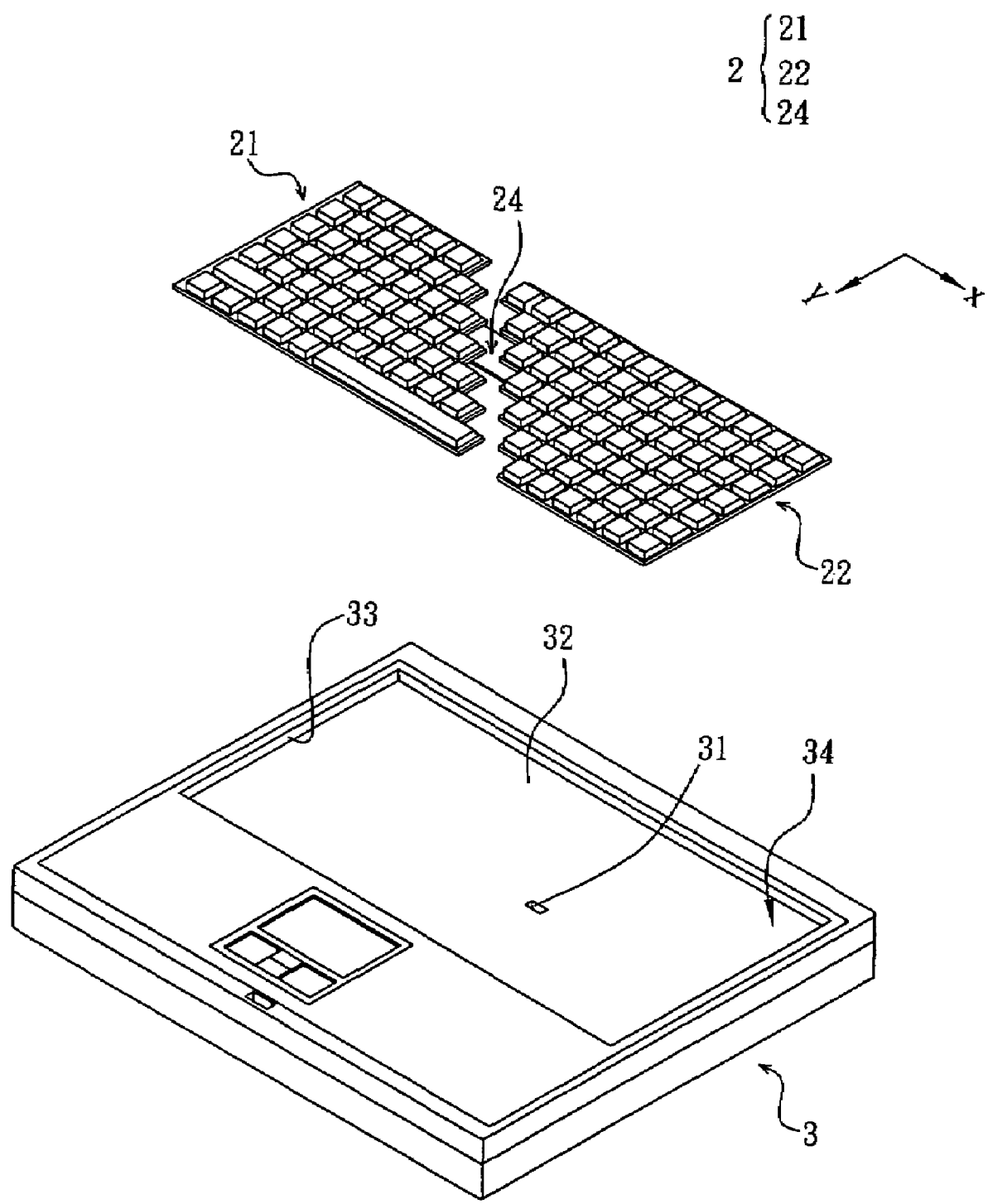
FIG. 2 is a pictorially exploded view showing a portion of an electronic device according to a first embodiment of the invention.
Figure 3:
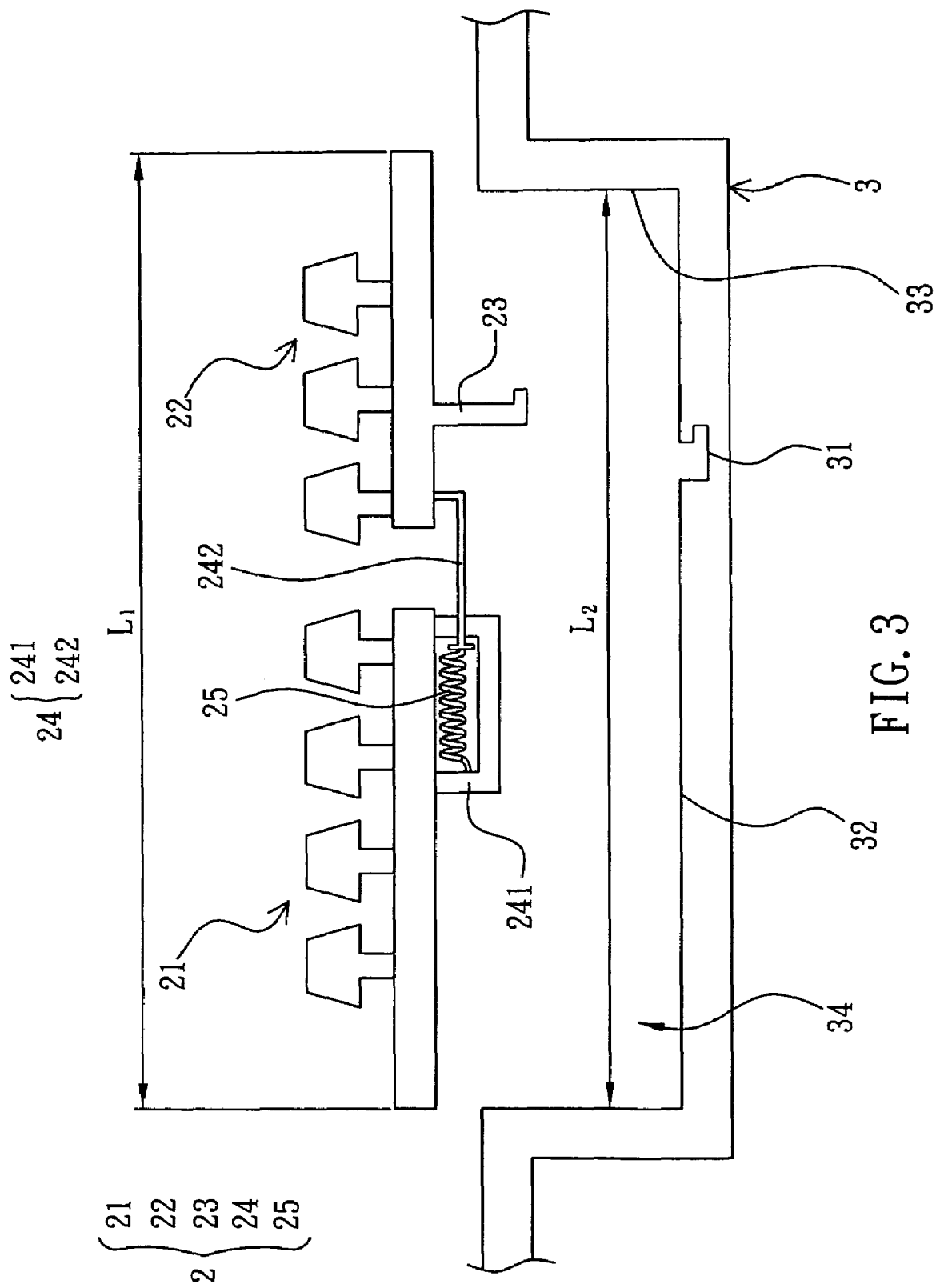
FIG. 3 is a schematic illustration showing a portion of an electronic device according to the first embodiment of the invention.

Referring to FIG. 2 and FIG. 3, a keyboard 2 according to a first embodiment of the invention is disposed in a base 3 and includes a first keyboard body 21, a second keyboard body 22, a second connecting member 23 and a connecting assembly 24.

Referring again to FIG. 2, the base 3 of this embodiment has a first connecting member 31, a bottom portion 32 and a sidewall portion 33. The bottom portion 32 and the sidewall portion 33 form an opening 34. In addition, as shown in FIG. 3, the first connecting member 31 may be disposed in the bottom portion 32 and may be an embedding slot. Furthermore, the first connecting member 31 and the base 3 may be integrally formed.

As shown in FIG. 3, a plurality of keys is disposed on each of the first keyboard body 21 and the second keyboard body 22, and the second keyboard body 22 is adjacent to the first keyboard body 21.

Referring again to FIG. 3, the second connecting member 23 of this embodiment may be disposed in the second keyboard body 22 and may be formed with a hook corresponding to the first connecting member 31. Herein, the second connecting member 23 is connected to the first connecting member 31. In addition, the second connecting member 23 may also be disposed in the first keyboard body 21. Furthermore, the second connecting member 23 and the first keyboard body 21 or the second keyboard body 22 may be integrally formed.

Furthermore, it is to be supplemented that the number and position of each of the first connecting member 31 and the second connecting member 23 of this embodiment may be adjusted according to the actual condition. Furthermore, the keyboard 2 or the base 3 may be formed with a plurality of first connecting members 31 and a plurality of second connecting members 23, so that the keyboard 2 may be mounted on the base 3 more firmly.

In addition, the preferred embodiment of the invention is not particularly limited to that the first connecting member 31 must be the embedding slot and the second connecting member 23 must be the hook. It is also possible to design the first connecting member 31 as a hook and the second connecting member 23 as an embedding slot. In this case, the first connecting member 31 still can be connected to the second connecting member 23.

Referring again to FIG. 3, the connecting assembly 24 connects the first keyboard body 21 to the second keyboard body 22. In this embodiment, the connecting assembly 24 has a limiting member 241 and a movable member 242. The limiting member 241 may be disposed in a bottom portion of the first keyboard body 21 and may be a chamber. In addition, the movable member 242 may be disposed in the bottom portion of the second keyboard body 22, and one end of the movable member 242 is in sliding connection with and disposed inside the limiting member 241.

Figure 4:
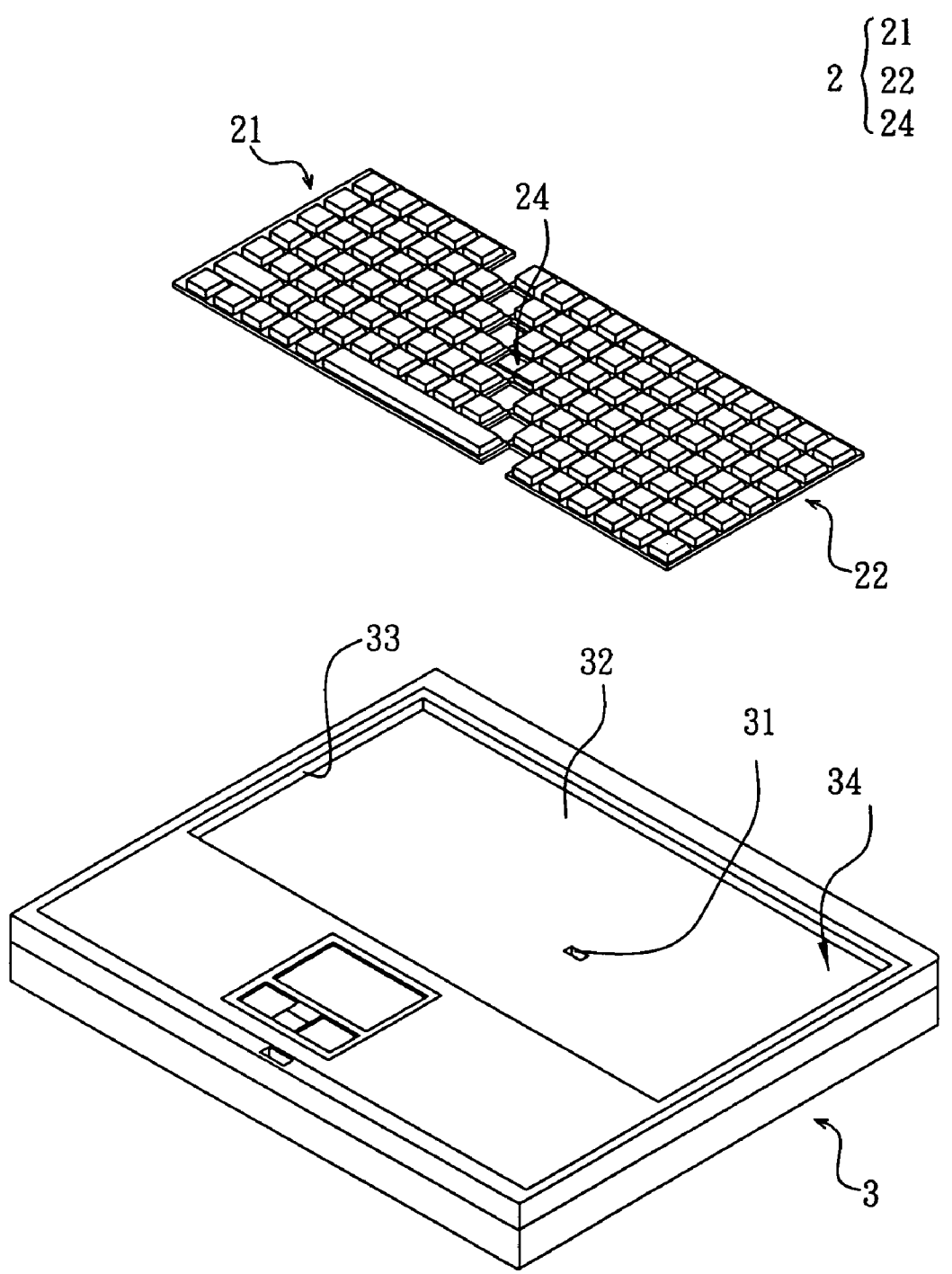
FIG. 4 is another pictorially exploded view showing a portion of an electronic device according to the first embodiment of the invention.

Herein, the connecting assembly 24 can adjust a relative distance between the first keyboard body 21 and the second keyboard body 22, so that the first keyboard body 21 and the second keyboard body 22 may be distant from each other (FIG. 2) or near to each other (FIG. 4). Accordingly, the total width of the keyboard can be changed.

Figure 6:
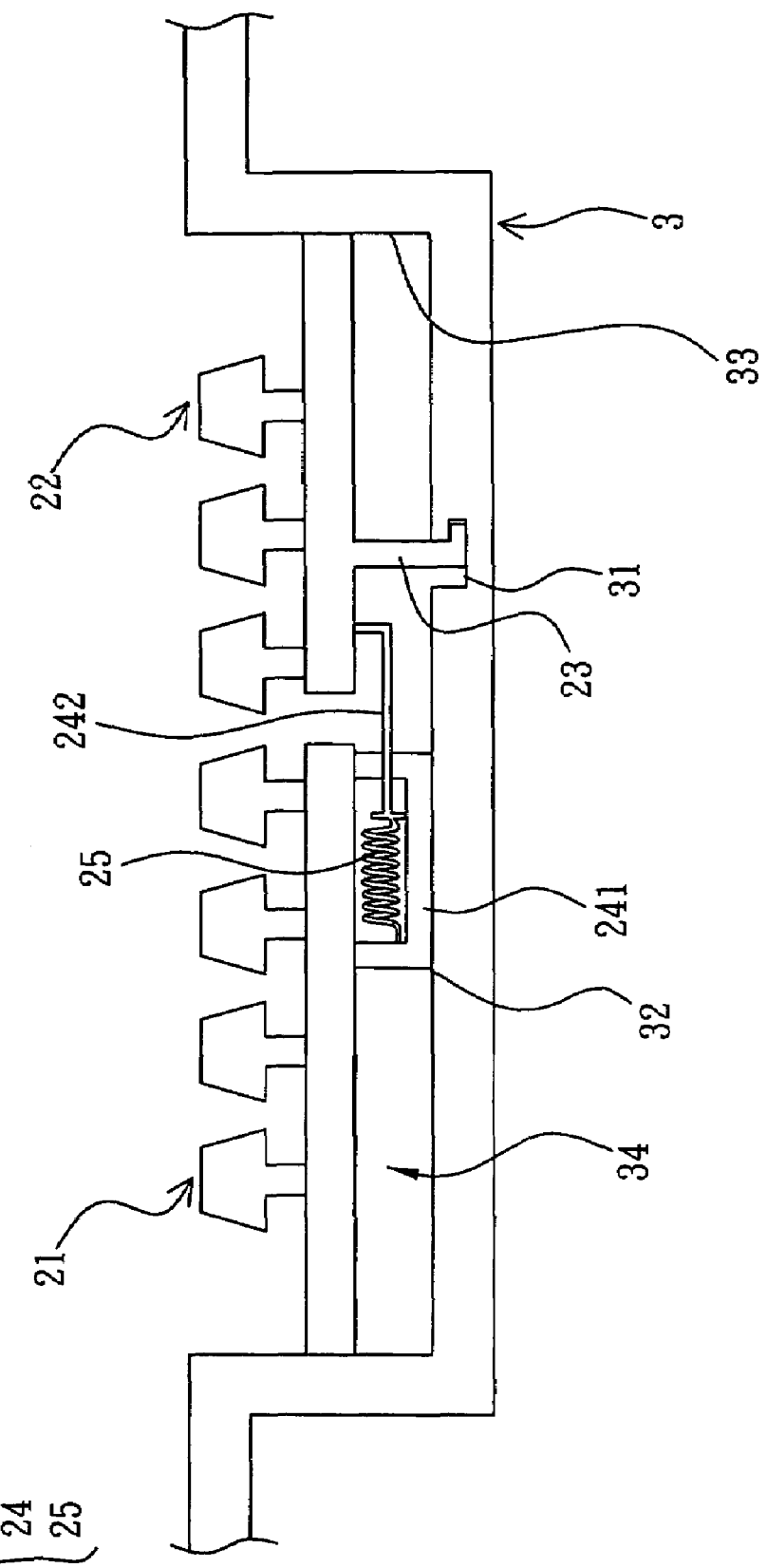
FIG. 6 is still another schematic illustration showing a portion of an electronic device according to the first embodiment of the invention.

Referring again to FIG. 3, this embodiment further has an elastic member 25 for connecting the limiting member 241 to the movable member 242. Thus, the elastic force of the elastic member 25 pushes the first keyboard body 21 and the second keyboard body 22 to positions distant from each other, as shown in FIG. 3 or 6.

Referring to FIGS. 2 and 4, the first keyboard body 21 and the second keyboard body 22 are disposed in parallel in this embodiment and approach or move away from each other along the X-axis direction. Of course, the bodies 21 and 22 may also be moved along the Y-axis direction (not shown).

The methods of mounting the keyboard 2 on the base 3 or disassembling the keyboard 2 from the base according to the first embodiment of the invention will be described herein below.

As shown in FIG. 3, because the limiting member 241 and the movable member 242 of the connecting assembly 24 are affected by the elastic force of the elastic member 25, the first keyboard body 21 and the second keyboard body 22 are moved away from each other so that the total length (L1) is longer than the length (L2) of the opening 34. Thus, the bodies 21 and 22 cannot directly pass through the opening 34 and then be disposed in the base 3.

Figure 5:
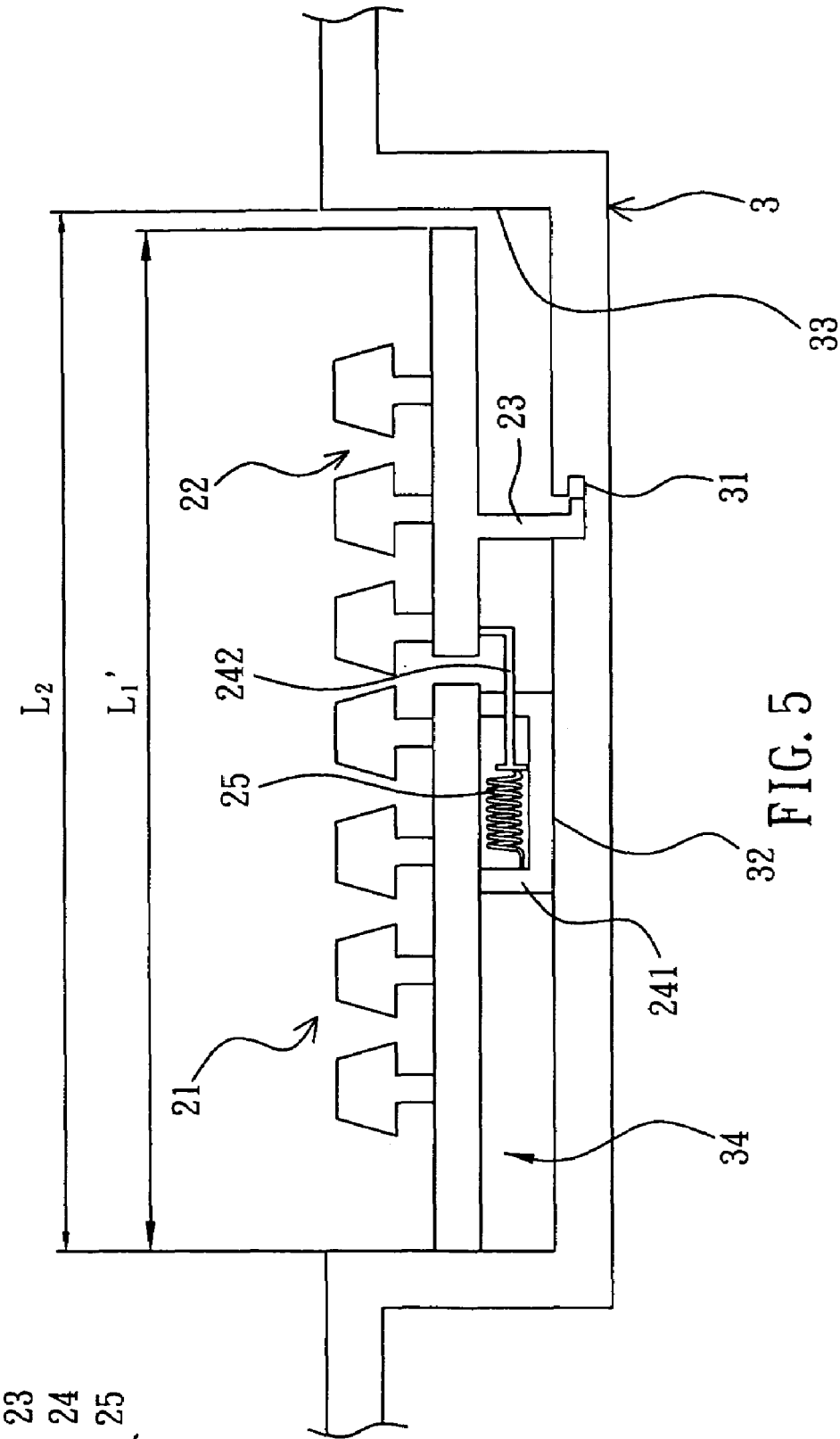
FIG. 5 is another schematic illustration showing a portion of an electronic device according to the first embodiment of the invention.

Next, as shown in FIG. 5, when the user applies a force so that the first keyboard body 21 and the second keyboard body 22 are moved to positions near to each other. In this case wherein the first keyboard body 21 and the second keyboard body 22 approach each other, the total width (L1') of the bodies 21 and 22 is smaller than the width (L2) of the opening 34. That is, the first keyboard body 21 and the second keyboard body 22 may pass through the opening 34 and then be mounted in the base 3.

Thereafter, as shown in FIG. 6, the user removes the force that is originally applied to the first keyboard body 21 and the second keyboard body 22, and the restoring elastic force of the elastic member 25 respectively pushes the limiting member 241 and the movable member 242 of the connecting assembly 24. Then, the first keyboard body 21 and the second keyboard body 22 are moved to positions distant from each other. Thus, the second connecting member 23 and the first connecting member 31 engage with each other so that the object of fixedly disposing the first keyboard body 21 and the second keyboard body 22 in the base 3.

On the contrary, when the user wants to disassemble the keyboard 2 from the base 3, he or she may apply another external force to the first keyboard body 21 and the second keyboard body 22 so as to make the first keyboard body 21 and the second keyboard body 22 approach each other. At this time, the second connecting member 23 is separated from the first connecting member 31. Next, the user may take out the first keyboard body 21 and the second keyboard body 22 from the opening 34 so that the keyboard 2 is disassembled from the base 3 completely.

As mentioned hereinabove, when the connecting assembly 24 makes the first keyboard body 21 and the second keyboard body 22 approach each other in this embodiment, the second connecting member 23 is separated from the first connecting member 31, as shown in FIG. 5. In this moment, the first keyboard body 21 and the second keyboard body 22 may be separated from the base 3.

On the contrary, when the first keyboard body 21 and the second keyboard body 22 are mounted on the base 3, the connecting assembly 24 makes the first keyboard body 21 and the second keyboard body 22 move away from each other, and the second connecting member 23 is connected to the first connecting member 31, as shown in FIG. 6.

Figure 7:
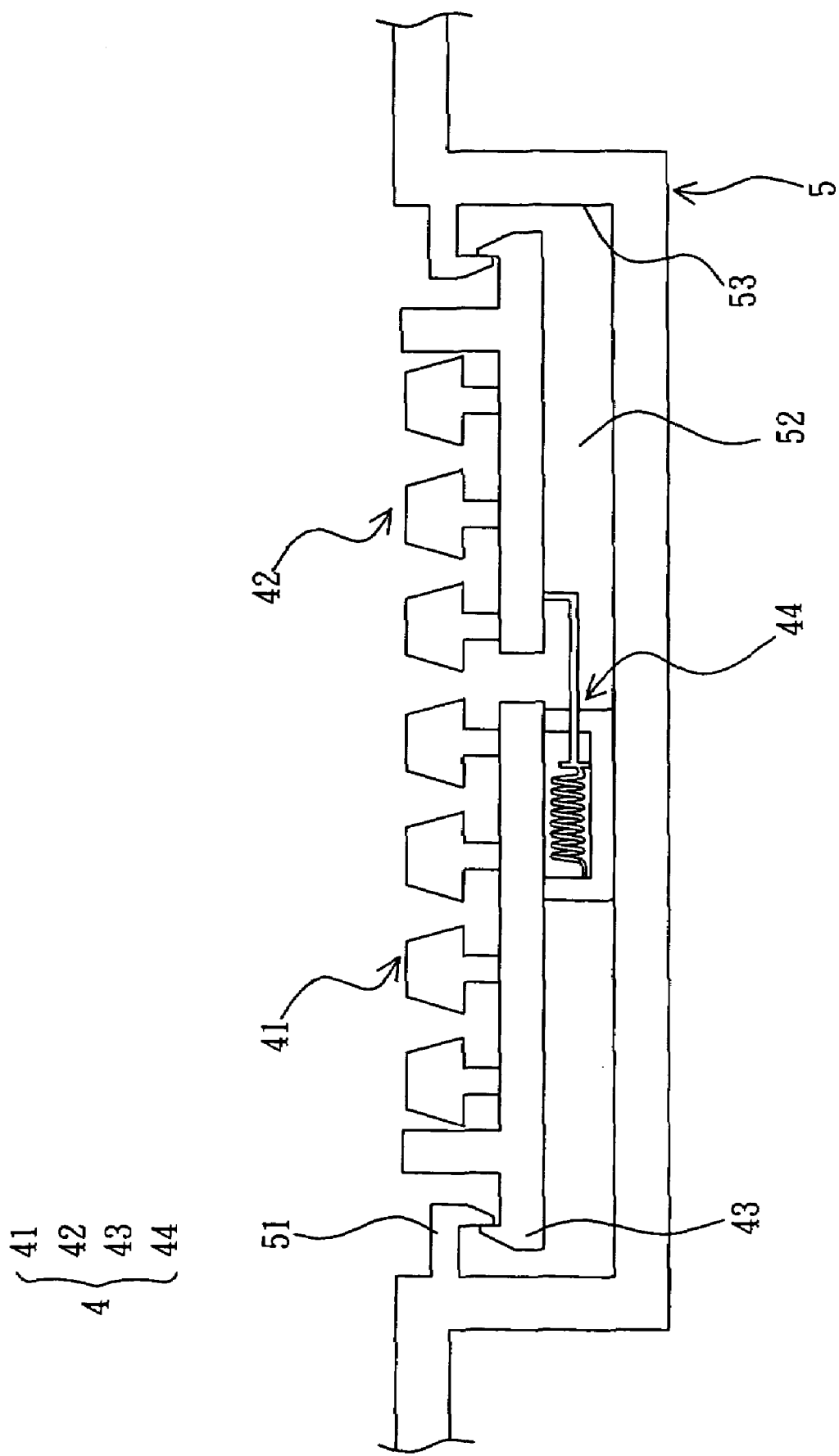
FIG. 7 is a schematic illustration showing a portion of an electronic device according to a second embodiment of the invention.

Referring to FIG. 7, a keyboard 4 according to a second embodiment of the invention is disposed in a base 5 and includes a first keyboard body 41, a second keyboard body 42, two second connecting members 43 and one connecting assembly 44.

The structures of the base 5, the first keyboard body 41, the second keyboard body 42 and the connecting assembly 44 of the second embodiment are the same as those of the base 3, the first keyboard body 21, the second keyboard body 22 and the connecting assembly 24 of the first embodiment, and detailed descriptions thereof will be omitted for concise purpose.

The differences between the second embodiment and the first embodiment include the following features.

The base 5 has two first connecting members 51, each of which is disposed on a sidewall portion 53 of an opening 52 of the base 5.

The second connecting members 43 are respectively disposed in the first keyboard body 41 and the second keyboard body 42.

When the first keyboard body 41 and the second keyboard body 42 approach each other, the first connecting member 51 does not interfere with the second connecting member 43. Thus, the keyboard 4 can be moved into and out of the opening 52 of the base 5, freely. On the contrary, when the first keyboard body 41 and the second keyboard body 42 are moved away from each other, the first connecting member 51 interferes with the second connecting member 43 so as to mount the keyboard 4 on the base 5.

A third embodiment of the invention also discloses an electronic device including a base, a first keyboard body, a second keyboard body, a second connecting member and a connecting assembly. Because the structures and functions of the base, the first keyboard body, the second keyboard body, the second connecting member and the connecting assembly are the same as those of the first embodiment, detailed descriptions thereof will be omitted for concise purpose.

As mentioned above, because the first keyboard body and the second keyboard body may slide relative to each other in the invention, the connecting assembly can adjust the relative distance between the first keyboard body and the second keyboard body. With the additional arrangements of the first connecting member and the second connecting member, the keyboard can be assembled without using any other tool, so that the assembling and disassembling processes can be easily performed. Compared to the prior art, the electronic device and keyboard of the invention can be easily assembled, and have short working time and reduced cost.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A keyboard disposed in a base having a first connecting member, the keyboard comprising:
   a first keyboard body;
   a second keyboard body, which is movably relative to the first keyboard body so that a total width of the keyboard is changeable;
   a connecting assembly connecting the first keyboard body to the second keyboard body; and
   a second connecting member disposed in the first keyboard body and capable of connecting to the first connecting member,
   wherein when the first keyboard body and the second keyboard body are mounted on the base, the connecting assembly enables the total width of the first keyboard body and the second keyboard body to be lengthened so that the second connecting member is connected to the first connecting member.

2. The keyboard according to claim 1, wherein when the first keyboard body and the second keyboard body approach each other, the first connecting member is separated from the second connecting member, and the first keyboard body and the second keyboard body are separated from the base.

3. The keyboard according to claim 1, wherein the base has an opening, and the first keyboard body and the second keyboard body are accommodated in the opening.

4. The keyboard according to claim 3, wherein when the first keyboard body and the second keyboard body approach each other, the total width of the first keyboard body and the second keyboard body is shortened, so that the first keyboard body and the second keyboard body are capable of passing through the opening to be mounted on the base.

5. The keyboard according to claim 1, wherein the first connecting member is disposed on a bottom portion or a sidewall portion of the opening.

6. The keyboard according to claim 1, wherein the first connecting member is a slot and the second connecting member is a hook.

7. The keyboard according to claim 1, wherein the first connecting member is a hook and the second connecting member is a slot.

8. The keyboard according to claim 1, wherein the connecting assembly comprises a limiting member and a movable member, the limiting member is disposed in the first keyboard body, the movable member is disposed in the second keyboard body, and one end of the movable member is in sliding connection with the limiting member.

9. The keyboard according to claim 8, further comprising:
   an elastic member for connecting the movable member to the limiting member.

10. The keyboard according to claim 1, wherein the first connecting member and the base are integrally formed.

11. The keyboard according to claim 1, wherein the second connecting member is integrally formed with the first keyboard body or the second keyboard body.

12. An electronic device, comprising:
    a base having a first connecting member; and
    a keyboard, which comprises:
      a first keyboard body,
      a second keyboard body, which is movably relative to the first keyboard body so that a total width of the keyboard is changeable,
      a connecting assembly connecting the first keyboard body to the second keyboard body, and
      a second connecting member disposed in the first keyboard body and capable of connecting to the first connecting member,
    wherein when the first keyboard body and the second keyboard body are mounted on the base, the connecting assembly enables a total width of the first keyboard body and the second keyboard body to be lengthened so that the second connecting member is connected to the first connecting member.

13. The electronic device according to claim 12, wherein when the first keyboard body and the second keyboard body approach each other, the first connecting member is separated from the second connecting member, and the first keyboard body and the second keyboard body are separated from the base.

14. The electronic device according to claim 12, wherein the base has an opening, and the first keyboard body and the second keyboard body are accommodated in the opening.

15. The electronic device according to claim 14, wherein when the first keyboard body and the second keyboard body approach each other, the total width of the first keyboard body and the second keyboard body is shortened, so that the first keyboard body and the second keyboard body are capable of passing through the opening to be mounted on the base.

16. The electronic device according to claim 14, wherein the first connecting member is disposed on a bottom portion or a sidewall portion of the opening.

17. The electronic device according to claim 12, wherein the first connecting member is a slot and the second connecting member is a hook.

18. The electronic device according to claim 12, wherein the first connecting member is a hook and the second connecting member is a slot.

19. The electronic device according to claim 12, wherein the connecting assembly comprises a limiting member and a movable member, the limiting member is disposed in the first keyboard body, the movable member is disposed in the second keyboard body, and one end of the movable member is in sliding connection with the limiting member.

20. The electronic device according to claim 19, wherein the keyboard further comprises:

an elastic member for connecting the movable member to the limiting member.

21. The electronic device according to claim 12, wherein the first connecting member and the base are integrally formed.

22. The electronic device according to claim 12, wherein the second connecting member is integrally formed with the first keyboard body or the second keyboard body.

* * * * *